United States Patent
Li et al.

(10) Patent No.: US 10,491,255 B2
(45) Date of Patent: Nov. 26, 2019

(54) WAKEUP CIRCUIT WITH AN OPTOCOUPLER FOR BATTERY SAMPLING INTEGRATED CHIP AND BATTERY ENERGY STORAGE SYSTEM

(71) Applicant: CONTEMPORARY AMPEREX TECHNOLOGY CO., LIMITED, Ningde (CN)

(72) Inventors: Jiade Li, Ningde (CN); Gaosong Shen, Ningde (CN); Fuming Ye, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 196 days.

(21) Appl. No.: 15/825,251

(22) Filed: Nov. 29, 2017

(65) Prior Publication Data
US 2018/0159574 A1    Jun. 7, 2018

(30) Foreign Application Priority Data
Dec. 6, 2016   (CN) ...................... 2016 2 1328257 U

(51) Int. Cl.
*H02J 9/00*    (2006.01)
*H04B 1/16*    (2006.01)
*H02J 7/00*    (2006.01)

(52) U.S. Cl.
CPC ............ *H04B 1/1615* (2013.01); *H02J 9/005* (2013.01); *H02J 7/0021* (2013.01)

(58) Field of Classification Search
CPC ......... H01J 37/241; B60R 21/017; H02J 7/00; H02J 9/005; H02J 7/0021; H04B 1/1615
USPC ....................................................... 250/214 R
See application file for complete search history.

(56) References Cited

U.S. PATENT DOCUMENTS 5,764,099 A * 6/1998 Hewitt ................... H02J 9/005
327/545

\* cited by examiner

*Primary Examiner* — Que Tan Le
(74) *Attorney, Agent, or Firm* — Tucker Ellis LLP

(57) ABSTRACT

Provided a wakeup circuit of a battery sampling integrated chip in battery energy storage system. The wakeup circuit includes a power end at a power low-voltage side, an optocoupler, and a switch transistor; wherein a first end of a primary side of the optocoupler is connected with the power end at the low-voltage side, and a second end of the primary side of the optocoupler is connected with a grounding end at the low-voltage side, a secondary side of the optocoupler is connected with a chip-wakeup end at a power high-voltage side, and the chip-wakeup end is connected with a wakeup pin of the battery sampling integrated chip; the switch transistor is connected in series with the primary side of the optocoupler, a control end of the switch transistor is connected with a wakeup signal input end at the low-voltage side.

10 Claims, 2 Drawing Sheets

WAKEUP CIRCUIT WITH AN OPTOCOUPLER FOR BATTERY SAMPLING INTEGRATED CHIP AND BATTERY ENERGY STORAGE SYSTEM

CROSS-REFERENCE TO RELATED APPLICATIONS

The present application claims the benefit of priority to Chinese Patent Application No. 201621328257.0, filed on Dec. 6, 2016, the content of which is incorporated herein by reference in its entirety.

TECHNICAL FIELD

The present application relates to the field of battery energy storage technologies and, particularly, relates to a wakeup circuit of a battery sampling integrated chip and a battery energy storage system.

BACKGROUND

A battery energy storage system generally includes a plurality of battery modules connected in series with each other, and each battery module consists of one battery cell or more battery cells connected in parallel or in series. For so many batteries, it is required battery management system can monitor battery performance parameters in real time, control charging and discharging of the battery modules, manage battery equalization, thermal management, battery status estimation, online diagnosis, early warning and so on. At present, a number of battery energy storage systems use a battery sampling integrated chip to achieve functions parameter like voltage acquisition for a single battery cell, and the battery sampling integrated chip needs to be woke up before the entire battery energy storage system is in normal operation. The battery energy storage system includes a power low-voltage side and a power high-voltage side, the battery sampling integrated chip belongs to the power high-voltage side, and a microcontroller unit (Microcontroller Unit, MCU) belongs to the power low-voltage side, data is transmitted between the battery sampling integrated chip and MCU by an isolation chip, a portion of the isolation chip belongs to the power high-voltage side, the other portion of the isolation chip belongs to the power low-voltage side, and both the portions of the isolation chip should be powered to achieve normal operation, however, for the power high-voltage side cannot be powered before the entire system is in normal operation, in order to wake up the battery sampling integrated chip, the existing solution is to take/get electricity from the power low-voltage side and then supply battery sampling integrated chip at the power high-voltage side by an isolation power source.

During implementing the present application, it is found that at least the following problems exist in the prior arts:

It should be noted that Isolation power source is costly, and it also may cause an electro-magnetic compatibility (EMC) problem due to characteristics of the isolation power source itself.

SUMMARY

The present application provides a wakeup circuit for a battery sampling integrated chip and a battery energy storage system, with which the battery sampling integrated chip can be woken up without using an isolation power source, therefore, reducing the cost of using the isolation power source and avoiding an electromagnetic compatibility (EMC) problem due to using of the isolation power source.

In one aspect, the present application provides a wakeup circuit for a battery sampling integrated chip, applied in a battery energy storage system, including:

a first power end at a power low-voltage side of the battery energy storage system;

a first grounding end at the power low-voltage side;

a wakeup signal input end at the power low-voltage side;

a chip-wakeup end at a power high-voltage side of the battery energy storage system;

an optocoupler; and a switch transistor;

wherein a first end of a primary side of the optocoupler is connected with the first power end, a second end of the primary side of the optocoupler is connected with the grounding end, a secondary side of the optocoupler is connected with the chip-wakeup end, and the chip-wakeup end is used to connect with a wakeup pin of the battery sampling integrated chip; the switch transistor is connected in series with the primary side of the optocoupler, and a control end of the switch transistor is connected with the wakeup signal input end.

Preferably, the wakeup circuit further includes:

a high-level input end;

a second grounding end at the power high-voltage side; and a first resistor;

wherein a first end of the secondary side of the optocoupler is connected with the high-level input end, a second end of the secondary side of the optocoupler is connected with the second grounding end by the first resistor, and is connected with the chip-wakeup end.

Preferably, the wakeup circuit further includes:

an isolation chip; and a diode, wherein the isolation chip includes a wakeup signal input pin at the power low-voltage side and a wakeup signal output pin at the power high-voltage side; an anode of the diode is connected with the wakeup signal output pin, and a cathode of the diode is connected with the chip-wakeup end.

Preferably, a first end of the switch transistor is connected with the second end of the primary side of the optocoupler, and a second end of the switch transistor is connected with the first grounding end at the power low-voltage side.

Preferably, the switch transistor is a triode, the control end of the switch transistor is a base of the triode, the first end of the switch transistor is a collector of the triode, and the second end of the switch transistor is an emitter of the triode.

Preferably, the wakeup circuit further includes a second resistor, wherein the second resistor is connected in series with the primary side of the optocoupler.

Preferably, the wakeup circuit further includes a third resistor, wherein the third resistor is connected in series with the secondary side of the optocoupler.

Preferably, the wakeup circuit further includes:

a second power end at the power high-voltage side; and a voltage-stabilizing circuit, the voltage-stabilizing circuit including an input end, an output end and a switch control end, wherein the input end of the voltage-stabilizing circuit is connected with a power input end of a battery module of the battery energy storage system, the output end of the voltage-stabilizing circuit is connected with the second power end, and the switch control end of the voltage-stabilizing circuit is connected with a drive end of the battery sampling integrated chip.

Preferably, the voltage-stabilizing circuit includes:

a fourth resistor, wherein a first end of the fourth resistor is connected with the input end of the voltage-stabilizing circuit, and a second end of the fourth resistor is connected with a first node;

a first capacitor, wherein a first end of the capacitor is connected with the first node, and a second end of the capacitor is connected with a second grounding end at the power high-voltage side;

a fifth resistor;

a drive triode, wherein a collector of the drive triode is connected with the first node, a base of the drive triode is connected with the switch control end of the voltage-stabilizing circuit by the fifth resistor, and an emitter of the drive triode is connected with a second node;

a second capacitor, wherein a first end of the second capacitor is connected with the second node, and a second end of the second capacitor is connected with the second grounding end at the power high-voltage side;

a sixth resistor, wherein a first end of the sixth resistor is connected with the second node, and a second end of the sixth resistor is connected with the output end of the voltage-stabilizing circuit; and a third capacitor, wherein a first end of the third capacitor is connected with the output end of the voltage-stabilizing circuit, and a second end of the third capacitor is connected with the second grounding end at the power high-voltage side.

In another aspect, the present application provides a battery energy storage system, including:

a battery module;

a microcontroller unit (MCU), the MCU including a wakeup signal output end;

a battery sampling integrated chip, the battery sampling integrated chip including a wakeup pin; and the above-described wakeup circuit for the battery sampling integrated chip wherein the battery sampling integrated chip is connected with the battery module, the MCU is communicated with the battery sampling integrated chip, and the wakeup pin of the battery sampling integrated chip is connected with the chip-wakeup end in the wakeup circuit; the wakeup signal output end of the MCU is connected with the wakeup signal input end at the power low-voltage side in the wakeup circuit.

In the embodiments of the present application, the wakeup circuit for the battery sampling integrated chip includes the optocoupler, and the switch transistor is provided at the power low-voltage side to control signal production of the primary side of the optocoupler, the secondary side of the optocoupler is used to connect with the battery sampling integrated chip at the power high-voltage side. When the wakeup signal produced at the power low-voltage side makes the primary side of the optocoupler produce a signal by the switch transistor, the secondary side of the optocoupler will produce a corresponding signal to wake up the battery sampling integrated chip. Therefore, without using an isolation power source, the battery sampling integrated chip at the power high-voltage side can be woken up by controlling at the power low-voltage side, thereby reducing the cost of using the isolation power source and avoiding an EMC problem due to using of the isolation power source.

BRIEF DESCRIPTION OF DRAWINGS

Accompanying drawings used in the embodiments will be briefly described so as to more clearly illustrate the technical solutions of the present application. It should be understood that, the following described accompanying drawings are merely some exemplary embodiments of the present application, based on which other accompanying drawings may be obtained by those skilled in the art without creative efforts.

DESCRIPTION OF EMBODIMENTS

In order to better understand technical solutions of the present application, the present application will be further illustrated with reference to the accompanying drawings and embodiments.

It should be understood that, the described embodiments are merely a part of exemplary embodiments of the present application but not all the embodiments of the present application. All other embodiments obtained by those skilled in the art without creative efforts according to the embodiments of the present application shall fall into the protection scope of the present application.

The terms used in the embodiments of the present application are merely for the purpose of describing particular embodiments but not intended to limit the present application. An expression of "a", "an", "the" or "such" in a singular form used in the embodiments and claims of the present disclosure is also intended to include the plural form thereof, unless otherwise noted.

It should be understood that, the expressions "first", "second" and "third" may be used to describe the "end", "resistor", "capacitor" and the like in the embodiments of the present application, but they are intended to distinguish rather than limit the "end", "resistor", "capacitor" and the like. For example, without departing from the scope of the present application embodiment, a first resistor may also be referred to as a second resistor, and similarly, a second capacitor may also be referred to as a first capacitor.

Figure 1:
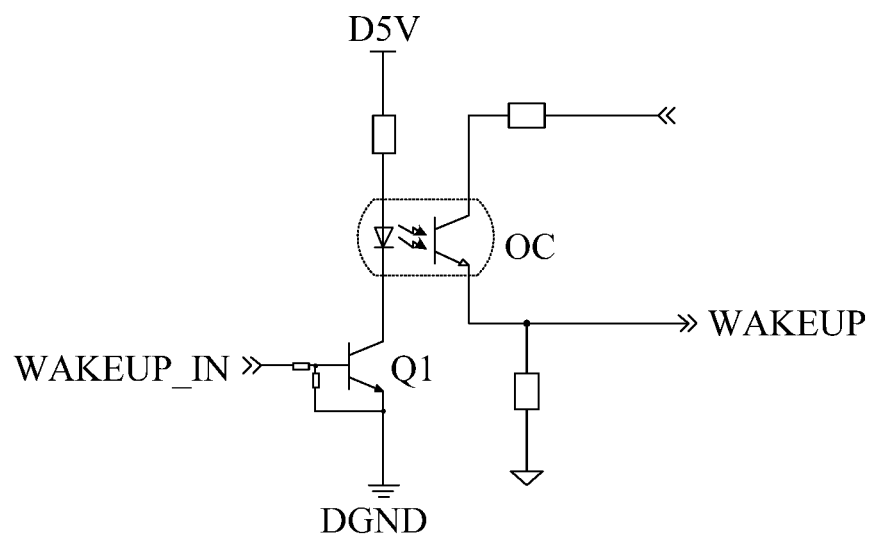
FIG. 1 is a structural schematic view of a wakeup circuit for a battery sampling integrated chip in accordance with an exemplary embodiment of the present application.

As shown in FIG. 1, an exemplary embodiment of the present application provides a wakeup circuit of a battery sampling integrated chip used for a battery energy storage system. The wakeup circuit includes: a power end D5V at a power low-voltage side; an optocoupler OC, a first end of a primary side of the optocoupler OC connected with the power end D5V at the power low-voltage side, a second end of the primary side of the optocoupler OC connected with a grounding end DGND at the power low-voltage side, a secondary side of the optocoupler OC connected with a chip-wakeup end WAKEUP at a power high-voltage side, and the chip-wakeup end WAKEUP used to connect with a wakeup pin (not shown in the figures) of the battery sampling integrated chip; a switch transistor Q1 connected in series with the primary side of the optocoupler OC, a control end of the switch transistor Q1 connected with a wakeup signal input end WAKEUP_IN at the power low-voltage side.

The battery energy storage system includes a microcontroller unit (Microcontroller Unit, MCU) (not shown in the figures) and a battery sampling integrated chip (not shown in the figures). The wakeup signal input end WAKEUP_IN is connected with the MCU, and the MCU produces a wakeup signal; the battery sampling integrated chip is connected with the chip-wakeup end WAKEUP and is woken up by receiving a signal of the chip-wakeup end WAKEUP. The battery energy storage system includes the power low-voltage side and the power high-voltage side. When the battery energy storage system is not completely in operation, elements at the power low-voltage side can be normally powered; at the moment, if the wakeup signal input end WAKEUP_IN has no signal, the switch transistor Q1 will be turned off, i.e., both the primary side and secondary side of the optocoupler OC have no current; when the battery sampling integrated chip needs to be woken up, the MCU at the power low-voltage side will send the wakeup signal to the control end of the switch transistor Q1 by the wakeup signal input end WAKEUP_IN, to turn on the switch transistor Q1, and at this moment, the primary side of the optocoupler OC has signal, which makes the secondary side of optocoupler OC have signal too; the signal of the secondary side of the optocoupler OC is transmitted to the chip-wakeup end WAKEUP, the chip-wakeup end WAKEUP is connected with the wakeup pin of the battery sampling integrated chip at the power high-voltage side, and thus the battery sampling integrated chip can be woken up.

In the present embodiment of the present application, the wakeup circuit for the battery sampling integrated chip includes the optocoupler, the switch transistor is placed at the power low-voltage side to control signal production of the primary side of the optocoupler, and the secondary side of the optocoupler is connected with the battery sampling integrated chip at the power high-voltage side. When the wakeup signal at the power low-voltage side makes the primary side of the optocoupler produce a signal by turning on the switch transistor, the secondary side of the optocoupler will produce a corresponding signal to wake up the battery sampling integrated chip. Therefore, without using an isolation power source, the battery sampling integrated chip at the power high-voltage side can be woken up by controlling at the power low-voltage side, thereby reducing the cost of using the isolation power source and avoiding an electro-magnetic compatibility (EMC) problem due to using of the isolation power source.

Figure 2:
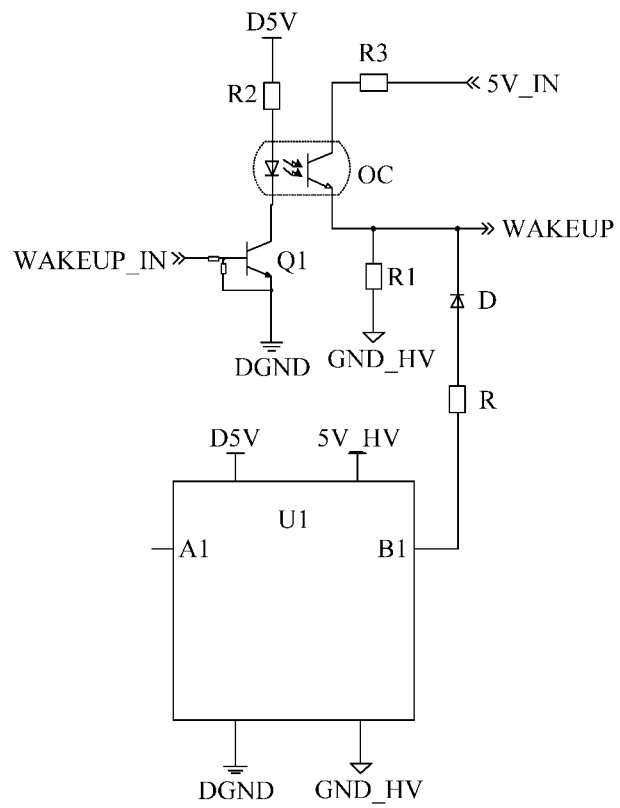
FIG. 2 is a structural schematic view of another wakeup circuit of a battery sampling integrated chip in accordance with an exemplary embodiment of the present application.

Optionally, as shown in FIG. 2, a first end of the secondary side of the optocoupler OC is connected with a high-level input end 5V_IN, a second end of the secondary side of the optocoupler OC is connected with a grounding end GND_HV at the power high-voltage side by a first resistor R1, and the second end of the secondary side of the optocoupler OC is connected with the chip-wakeup end WAKEUP. It should be noted that, in the battery energy storage system, the high-level input end 5V_IN belongs to the power high-voltage side, but the high-level input end 5V_IN does not need power supply from the power source at the power high-voltage side, instead, the high-level input end 5V_IN is directly powered by a battery module (not shown in the figures). For example, the high-level input end 5V_IN can be connected with a high-level pin of the battery sampling integrated chip, and the high-level pin is directly powered by the battery module. In the present embodiment, the high-level pin is used to produce a secondary side current of the optocoupler OC when the power high-voltage side is not powered. The first resistor R1 is configured for producing a voltage value desired by the chip-wakeup end WAKEUP.

Optionally, the above-described wakeup circuit for the battery sampling integrated chip further includes: an isolation chip U1, the isolation chip U1 including a wakeup signal input pin A1 at the low-voltage side and a wakeup signal output pin B1 at the high-voltage side; a diode D, an anode of the diode D connected with the wakeup signal output pin B1, a cathode of the diode D connected with the chip-wakeup end WAKEUP; and a current-limiting resistor R connected in series with the diode D. The current-limiting resistor R can be connected between the cathode of the diode D and the chip-wakeup end WAKEUP, or connected between the anode of the diode D and the wakeup signal output pin B1 at the high-voltage side. In the battery energy storage system, a microcontroller unit (Microcontroller Unit, MCU) is connected with the wakeup signal input pin A1 at the low-voltage side of the isolation chip U1. The isolation chip U1 includes a portion corresponding to the power low-voltage side and another portion corresponding to the power high-voltage side, the portion corresponding to the power low-voltage side is powered by the power end D5V at the power low-voltage side and connected with the grounding end DGND at the power low-voltage side, and the portion corresponding to the power high-voltage side is powered by the power end 5V_HV at the power high-voltage side and connected with the grounding end GND_HV at the power high-voltage side. The isolation chip U1 is configured for transmitting a signal between the wakeup signal input pin A1 at the low-voltage side and the wakeup signal output pin B1 at the high-voltage side, in addition, the isolation chip U1 further includes other data pins (not shown in the figures) configured for transmitting other signals between the power low-voltage side and the power high-voltage side. Only when both the power end D5V at the power low-voltage side and the power end 5V_HV at the power high-voltage side supply power, the isolation chip U1 can operate normally, at this moment, the battery sampling integrated chip can be woken up not by the optocoupler OC, instead, the wakeup signal is transmitted from the wakeup signal input pin A1 at the low-voltage side to the isolation chip U1 by the MCU, and then the wakeup signal is transmitted from the wakeup signal output pin B1 at the high-voltage side to the chip-wakeup end WAKEUP by the isolation chip U1, thereby waking up the battery sampling integrated chip. It should be noted that, only when both the power end D5V at the power low-voltage side and the power end 5V_HV at the power high-voltage side supply power, the battery sampling integrated chip can be woken up by the isolation chip U1. However, when the power end 5V_HV at the power high-voltage side does not supply power, the battery sampling integrated chip can still be woken up by the optocoupler OC.

Optionally, a first end of the switch transistor Q1 is connected with the second end of the primary side of the optocoupler OC, and a second end of the switch transistor Q1 is connected with the grounding end DGND at the power low-voltage side. It can be understood that, it is only an exemplary implementation of the present embodiment that the switch transistor Q1 is connected between the primary side of the optocoupler OC and the grounding end DGND at the power low-voltage side, and in other implementations, as long as the switch transistor Q1 is connected in series with the primary side of the optocoupler OC and can control whether the primary side of the optocoupler OC is turned on or not, the switch transistor Q1 may otherwise be connected between the primary side of the optocoupler OC and the power end D5V at the power low-voltage side.

The switch transistor Q1 is a triode, the control end of the switch transistor Q1 is a base of the triode, the first end of the switch transistor Q1 is a collector of the triode, and the second end of the switch transistor Q1 is an emitter of the triode. It can be understood that, it is only an exemplary implementation of the present embodiment that the switch transistor Q1 is a triode, and in other implementations, the switch transistor Q1 may otherwise be a metal-oxide-semiconductor field-effect transistor (Metal-Oxide-Semiconductor Field-Effect Transistor, MOSFET) or another type of switch transistor, as long as the switch transistor Q1 is an element playing a role of a switch.

Optionally, the above-described wakeup circuit for the battery sampling integrated chip further includes: a second resistor R2 connected in series with the primary side of the optocoupler OC. The second resistor R2 plays a role of limiting current. When the switch transistor Q1 is connected between the primary side of the optocoupler OC and the grounding end DGND at the power low-voltage side, as long as the second resistor R2 is connected in series with the primary side of the optocoupler OC and plays the role of limiting current, the second resistor R2 can be connected between the primary side of the optocoupler OC and the power end D5V at the power low-voltage side, or between the switch transistor Q1 and the primary side of the optocoupler OC.

Optionally, the above-described wakeup circuit for the battery sampling integrated chip further includes: a third resistor R3 connected in series with the secondary side of the optocoupler OC. Similarly to the second resistor R2, the third resistor R3 also plays a role of limiting current. As long as the third resistor R3 is connected in series with the secondary side of the optocoupler OC, it can be connected between the high-level input end 5V_IN and the secondary side of the optocoupler OC, or between the secondary side of the optocoupler OC and the chip-wakeup end WAKEUP.

Figure 3:
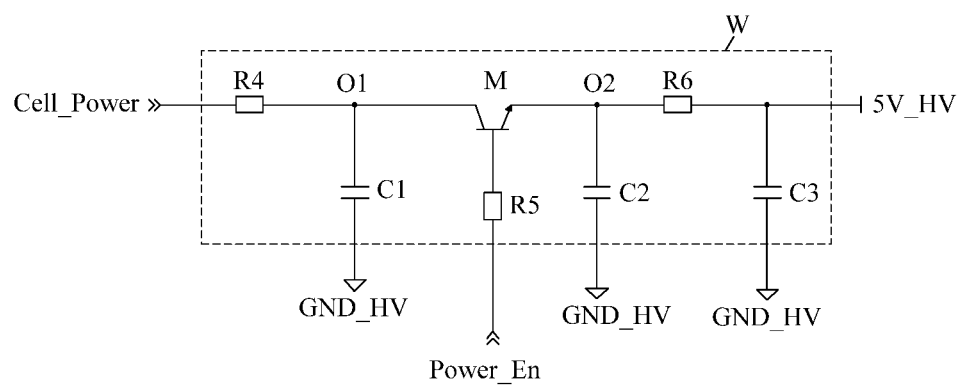
FIG. 3 is a structural schematic view of a voltage-stabilizing circuit in accordance with an exemplary embodiment of the present application.

Further, as shown in FIG. 3, the above-described wakeup circuit for the battery sampling integrated chip further includes: a voltage-stabilizing circuit W. The voltage-stabilizing circuit W includes an input end, an output end and a switch control end, the input end of the voltage-stabilizing circuit W is connected with a power input end Cell_Power of the battery module, the output end of the voltage-stabilizing circuit W is connected with the power end 5V_HV at the high-voltage side, and the switch control end of the voltage-stabilizing circuit W is connected with a drive end Power_En of the battery sampling integrated chip. In the battery energy storage system, the battery module is connected with and supplies power to the power input end Cell_Power. The drive end Power_En of the battery sampling integrated chip controls whether the voltage-stabilizing circuit W is turned on or turned off. After the battery sampling integrated chip is woken up, the drive end Power_En produces a drive signal to turn on the voltage-stabilizing circuit W, and the battery module supplies power to the power end 5V_HV at the power high-voltage side by the voltage-stabilizing circuit W, and further supplies power to the isolation chip U1 and corresponding ends of the battery sampling integrated chip, so that the entire system can operate normally.

The voltage-stabilizing circuit W includes: a fourth resistor R4, a first end of the fourth resistor R4 connected with the input end of the voltage-stabilizing circuit W (i.e., the first end of the fourth resistor R4 connected with the power input end Cell_Power of the battery module), a second end of the fourth resistor R4 connected with a first node O1; a first capacitor C1, a first end of the first capacitor C1 connected with the first node O1, a second end of the first capacitor C1 connected with the grounding end GND_HV at the power high-voltage side; a drive triode M, a collector of the drive triode M connected with the first node O1, a base of the drive triode M connected with the switch control end of the voltage-stabilizing circuit W (i.e., the base of the drive triode M is connected with the drive end POWER_EN of the battery sampling integrated chip) by a fifth resistor R5, an emitter of the drive triode M connected with a second node O2; a second capacitor C2, a first end of the second capacitor C2 connected with the second node O2, a second end of the second capacitor C2 connected with the grounding end GND_HV at the power high-voltage side; a sixth resistor R6, a first end of the sixth resistor R6 connected with the second node O2, a second end of the sixth resistor R6 is connected with the output end of the voltage-stabilizing circuit W (i.e., the second end of the sixth resistor R6 is connected with the power end 5V_HV at the power high-voltage side); a third capacitor C3, a first end of the third capacitor C3 connected with the output end of the voltage-stabilizing circuit W (i.e., the first end of the third capacitor C3 is connected with the power end 5V_HV at the power high-voltage side), a second end of the third capacitor C3 connected with the grounding end GND_HV at the power high-voltage side. The drive triode M mainly plays a role of switch controlling and voltage regulating and is used to transfer the power source voltage of the battery module into a usable voltage for the power end 5V_HV at the power high-voltage side, the capacitors thereof plays a role of filtering waves and is used for stabilizing voltage.

In the present embodiment of the present application, the wakeup circuit for the battery sampling integrated chip includes the optocoupler, the switch transistor is provided at the power low-voltage side to control signal production of the primary side of the optocoupler, and the secondary side of the optocoupler is connected with the battery sampling integrated chip at the power high-voltage side. When the wakeup signal produced at the power low-voltage side makes the primary side of the optocoupler produce signal by the switch transistor, the secondary side of the optocoupler will produce a corresponding signal to wake up the battery sampling integrated chip. Therefore, without using an isolation power source, the battery sampling integrated chip at the power high-voltage side can be woken up by controlling at the power low-voltage side, thereby reducing the cost of using the isolation power source and avoiding an EMC problem due to using of the isolation power source.

An exemplary embodiment of the present application provides a battery energy storage system, including: a battery module, a microcontroller unit MCU, a battery sampling integrated chip and the above-described wakeup circuit for the battery sampling integrated chip. The battery sampling integrated chip is connected with the battery module, and the MCU is communicated with the battery sampling integrated chip. The battery sampling integrated chip includes a wakeup pin, and the wakeup pin is connected with the chip-wakeup end WAKEUP of the wakeup circuit. The MCU includes a wakeup signal output end, and the wakeup signal output end is connected with the wakeup signal input end WAKEUP_IN at the power low-voltage side in the wakeup circuit.

It should be noted that, a specific structure and principle of the wakeup circuit for the battery sampling integrated chip in the present embodiment are the same as those of the above-described embodiments, which will not be repeated herein.

In the battery energy storage system provided by the present embodiment of the present application, the wakeup circuit for the battery sampling integrated chip includes the optocoupler, and the switch transistor is provided at the power low-voltage side to control signal production of the primary side of the optocoupler, and the secondary side of the optocoupler is connected with the battery sampling integrated chip at the power high-voltage side. When the wakeup signal at the power low-voltage side makes the primary side of the optocoupler produce signal by the switch transistor, the secondary side of the optocoupler will produce a corresponding signal to wake up the battery sampling integrated chip. Therefore, without using an isolation power source, the battery sampling integrated chip at the power high-voltage side can be woken up by controlling at the power low-voltage side, thereby reducing the cost of using the isolation power source and avoiding an EMC problem due to using of the isolation power source.

In the above-described embodiments provided by the present application, it should be understood that, the systems, devices, and methods disclosed herein can be implemented in other manners. For example, the above-described device embodiments are merely exemplary. For example, the division of the units is only a logical function division, and there may be other division manners in the actual implementation. For example, multiple units or components may be combined or can be integrated into another system, or some features can be ignored, or not executed. In another respect, the coupling, direct coupling or communication shown or discussed may be achieved by some interfaces, and the indirect coupling or communication of the devices or units may be electrical, mechanical or otherwise.

The units described as separated parts can be or not be physically separated, and the components shown as units can be or not be physical units, that is, the components can be located in one place or distributed in multiple network units. Part or all of the units can be selected to achieve the purposes of the solutions of the embodiments according to actual demands.

In addition, the functional units in each embodiment of the present application can be integrated into one processing unit, or each unit can be separately and physically present, or two or more units can be integrated into one unit. The above-described integrated unit can be implemented in a form of hardware, and can also be implemented in a form of hardware plus software functional units.

The above description only shows the preferred embodiments of the present application and is not intended to limit the present application. Any modification, equivalent substitution, improvement and the like within the principles of the present application shall be included in the protection scope of the present application.

What is claimed is:

1. A wakeup circuit for a battery sampling integrated chip, comprising:
    a first power end at a power low-voltage side;
    a first grounding end at the power low-voltage side;
    a wakeup signal input end at the power low-voltage side;
    a chip-wakeup end at a power high-voltage side;
    an optocoupler; and
    a switch transistor;
    wherein a first end of a primary side of the optocoupler is connected with the first power end, a second end of the primary side of the optocoupler is connected with the grounding end, a secondary side of the optocoupler is connected with the chip-wakeup end, and the chip-wakeup end is used to connect with a wakeup pin of the battery sampling integrated chip; the switch transistor is connected in series with the primary side of the optocoupler, and a control end of the switch transistor is connected with the wakeup signal input end.

2. The wakeup circuit according to claim 1, further comprising:
    a high-level input end;
    a second grounding end at the power high-voltage side; and
    a first resistor;
    wherein a first end of the secondary side of the optocoupler is connected with the high-level input end, a second end of the secondary side of the optocoupler is connected with the second grounding end by the first resistor, and is connected with the chip-wakeup end.

3. The wakeup circuit according to claim 2, further comprising:
    an isolation chip; and
    a diode,
    wherein the isolation chip comprises a wakeup signal input pin at the power low-voltage side and a wakeup signal output pin at the power high-voltage side; an anode of the diode is connected with the wakeup signal output pin, and a cathode of the diode is connected with the chip-wakeup end.

4. The wakeup circuit according to claim 3, wherein a first end of the switch transistor is connected with the second end of the primary side of the optocoupler, and a second end of the switch transistor is connected with the first grounding end at the power low-voltage side.

5. The wakeup circuit according to claim 4, wherein the switch transistor is a triode, the control end of the switch transistor is a base of the triode, the first end of the switch transistor is a collector of the triode, and the second end of the switch transistor is an emitter of the triode.

6. The wakeup circuit according to claim 1, further comprising a second resistor, wherein the second resistor is connected in series with the primary side of the optocoupler.

7. The wakeup circuit according to claim 6, further comprising a third resistor, wherein the third resistor is connected in series with the secondary side of the optocoupler.

8. The wakeup circuit according to claim 7, further comprising:
    a second power end at the power high-voltage side; and
    a voltage-stabilizing circuit, the voltage-stabilizing circuit comprising an input end, an output end and a switch control end,
    wherein the input end of the voltage-stabilizing circuit is connected with a power input end of a battery module, the output end of the voltage-stabilizing circuit is connected with the second power end, and the switch control end of the voltage-stabilizing circuit is connected with a drive end of the battery sampling integrated chip.

9. The wakeup circuit according to claim 8, wherein the voltage-stabilizing circuit comprises:
    a fourth resistor, wherein a first end of the fourth resistor is connected with the input end of the voltage-stabilizing circuit, and a second end of the fourth resistor is connected with a first node;
    a first capacitor, wherein a first end of the capacitor is connected with the first node, and a second end of the capacitor is connected with a second grounding end at the power high-voltage side;
    a fifth resistor;
    a drive triode, wherein a collector of the drive triode is connected with the first node, a base of the drive triode is connected with the switch control end of the voltage-stabilizing circuit by the fifth resistor, and an emitter of the drive triode is connected with a second node;

a second capacitor, wherein a first end of the second capacitor is connected with the second node, and a second end of the second capacitor is connected with the second grounding end at the power high-voltage side;

a sixth resistor, wherein a first end of the sixth resistor is connected with the second node, and a second end of the sixth resistor is connected with the output end of the voltage-stabilizing circuit; and a third capacitor, wherein a first end of the third capacitor is connected with the output end of the voltage-stabilizing circuit, and a second end of the third capacitor is connected with the second grounding end at the power high-voltage side.

10. A battery energy storage system, comprising:
a battery module;
a microcontroller unit (MCU), the MCU comprising a wakeup signal output end;
a battery sampling integrated chip, the battery sampling integrated chip comprising a wakeup pin; and
the wakeup circuit for the battery sampling integrated chip according to claim 1;
wherein the battery sampling integrated chip is connected with the battery module, the MCU is communicated with the battery sampling integrated chip, and the wakeup pin of the battery sampling integrated chip is connected with the chip-wakeup end in the wakeup circuit; the wakeup signal output end of the MCU is connected with the wakeup signal input end at the power low-voltage side in the wakeup circuit.

* * * * *